United States Patent
Radu et al.

(10) Patent No.: US 12,071,810 B2
(45) Date of Patent: Aug. 27, 2024

(54) GLAZING UNIT WITH FREQUENCY SELECTIVE COATING AND METHOD

(71) Applicants: AGC GLASS EUROPE, Louvain-la-neuve (BE); AGC INC., Chiyoda Ku (JP); AGC FLAT GLASS NORTH AMERICA, INC., Alpharetta, GA (US); AGC VIDROS DO BRASIL LTDA, Sao Paulo (BR)

(72) Inventors: Xavier Radu, Gosselies (BE); André Ribesse, Gosselies (BE)

(73) Assignees: AGC GLASS EUROPE, Louvain-la-Neuve (BE); AGC INC., Chiyoda Ku (JP); AGC FLAT GLASS NORTH AMERICA, INC., Alpharetta, GA (US); AGC VIDROS DO BRASIL LTDA, Sao Paulo (BR)

( * ) Notice: Subject to any disclaimer, the term of this patent is extended or adjusted under 35 U.S.C. 154(b) by 343 days.

(21) Appl. No.: 17/424,312

(22) PCT Filed: Feb. 12, 2020

(86) PCT No.: PCT/EP2020/053555
§ 371 (c)(1),
(2) Date: Jul. 20, 2021

(87) PCT Pub. No.: WO2020/165222
PCT Pub. Date: Aug. 20, 2020

(65) Prior Publication Data
US 2022/0154526 A1    May 19, 2022

(30) Foreign Application Priority Data
Feb. 13, 2019 (EP) ...................................... 19157028

(51) Int. Cl.
*C03C 17/36* (2006.01)
*B32B 17/10* (2006.01)
(Continued)

(52) U.S. Cl.
CPC .......... *E06B 9/24* (2013.01); *B32B 17/10036* (2013.01); *B32B 17/10192* (2013.01);
(Continued)

(58) Field of Classification Search
CPC .......... H01Q 15/0013; B32B 17/10174; B32B 17/10183; B32B 17/10192;
(Continued)

(56) References Cited

U.S. PATENT DOCUMENTS

2003/0080909 A1* 5/2003 Voeltzel ............. H01Q 15/0013
                                                                343/713
2009/0027300 A1* 1/2009 Kudo .................. H05K 9/0094
                                                                343/912
(Continued)

FOREIGN PATENT DOCUMENTS

DE  10 2011 115 967 A1   4/2013
FI           127500 B   *  7/2018
(Continued)

OTHER PUBLICATIONS

Machine translation of JP 2011/102218 A.*
International Search Report issued on Mar. 25, 2020 in PCT/EP2020/053555 filed on Feb. 12, 2020.

*Primary Examiner* — Z. Jim Yang
(74) *Attorney, Agent, or Firm* — Oblon, McClelland, Maier & Neustadt, L.L.P.

(57) ABSTRACT

A glazing unit with a glass panel that is low in reflectance for RF radiation, a coating system that is high in reflectance for RF radiation disposed on the glass panel and creating onto the glazing unit a dual band bandpass filter. The glazing unit
(Continued)

further features at least one frequencies selective decoated portion of the coating system extending along a plane, P, defined by a longitudinal axis, X, and a vertical axis, Z; having a width, DW, measured along the longitudinal axis, X, and a length, DL, measured along the vertical axis, Z. The frequencies selective decoated portion includes a first decoated element with a plurality of unit cells forming a regular grid, and a plurality of second decoated elements wherein a second decoated element is placed in each unit cell of the first decoated element and no second decoated element is in contact with the first decoated element.

21 Claims, 8 Drawing Sheets

(51) Int. Cl.
  *E06B 3/67* (2006.01)
  *E06B 9/24* (2006.01)
  *H01Q 1/12* (2006.01)
  *H01Q 15/00* (2006.01)
(52) U.S. Cl.
  CPC .. *B32B 17/10761* (2013.01); *B32B 17/10889* (2013.01); *E06B 3/6715* (2013.01); *H01Q 1/1271* (2013.01); *H01Q 15/0013* (2013.01); *B32B 2307/416* (2013.01); *E06B 2009/2417* (2013.01)
(58) Field of Classification Search
  CPC .......... B32B 17/1022; B32B 17/10229; C03C 17/366; C03C 17/3644; C03C 17/3647; C03C 17/3681; G02B 5/204; G02B 5/208; G02B 5/281; G02B 5/282; G02B 5/284; G02B 5/285
  See application file for complete search history.

(56) References Cited

U.S. PATENT DOCUMENTS

| | | | |
|---|---|---|---|
| 2013/0295300 A1 | 11/2013 | Paulus | |
| 2015/0093554 A1* | 4/2015 | Estinto | B23K 26/02 428/210 |
| 2015/0202719 A1* | 7/2015 | Wohlfeil | B23K 26/0006 428/209 |
| 2015/0229030 A1* | 8/2015 | Dai | C03C 27/10 219/203 |
| 2015/0343884 A1 | 12/2015 | Rousselet et al. | |
| 2016/0009592 A1* | 1/2016 | Arslan | B23K 26/364 428/209 |
| 2016/0231417 A1* | 8/2016 | Aoki | G01S 7/032 |
| 2016/0286609 A1* | 9/2016 | Paulus | H01Q 15/0013 |
| 2016/0374150 A1* | 12/2016 | Guillaume | B32B 17/10174 |
| 2018/0090825 A1* | 3/2018 | Jiang | H04M 1/0283 |
| 2018/0111448 A1 | 4/2018 | Rousselet et al. | |
| 2018/0159241 A1* | 6/2018 | Niembro | C03C 17/23 |
| 2021/0129495 A1* | 5/2021 | Asai | B32B 17/10761 |
| 2022/0396989 A1* | 12/2022 | Inaoka | E06B 3/6722 |

FOREIGN PATENT DOCUMENTS

| | | | |
|---|---|---|---|
| GB | 2 452 665 A | | 3/2009 |
| JP | 10-335877 A | | 12/1998 |
| JP | 2011102218 A | * | 5/2011 |

* cited by examiner

GLAZING UNIT WITH FREQUENCY SELECTIVE COATING AND METHOD

TECHNICAL FIELD

The present invention relates to a glazing unit with frequency selective coating.

BACKGROUND ART

The invention is concerned generally with provision of a surface on a coated glass panel, which has frequency selective transmission characteristics and, in some embodiments, to providing such a surface on glazing sheets having a coating system such as a solar control coating deposited thereon.

In glazing for buildings and automotive applications, antennas for reception and, or transmission of radio frequency (RF) waves are commonly incorporated. These may be realised as, for example, conductive films deposited on the glazing or metal wires or strips attached thereto. In laminated glazings, which typically comprise two or more glass sheets bonded by a polymer interlayer, the antennas might be located within the laminate i.e. within the interlayer or on a glass surface contacting the interlayer.

In addition, in many cases additional equipment is operated within the vehicle or the building, which radiates and/or receives radiofrequency signals. To ensure function of this equipment, sufficient transmittance through the glazing is necessary.

Although glazing unit, particularly for automotive applications, are predominantly formed in glass, other materials such as polycarbonates are known and references to glass throughout this application should not be regarded as limiting.

In order to reduce the accumulation of heat in the interior of a building or vehicle, a glazing unit may be coated with a coating system, for example a solar control coating system, that absorbs or reflects solar energy. Inclusion of solar control films, particularly on glazings for use in warm, sunny climates, is desirable because they reduce the need for air conditioning or other temperature regulation methods. This affords savings in terms of energy consumption and environmental impact.

Such coating systems, however, are typically electrically conductive and are high in reflectance for RF radiation. This effect impedes reception or transmission by antennas.

This makes the coating systems efficient reflectors of broad bands of radio frequency signals. Furthermore, commercial construction, automotive, train, . . . tend to use other materials that further block RF signals. Materials such as concrete, brick, mortar, steel, aluminium, roofing tar, gypsum wall board, and some types of wood all offer varying degrees of RF absorption. The result is that many newer constructions severely impede RF signals from getting into or out of the buildings.

Nonetheless, RF devices have become an important part of modern life, especially with the huge penetration of cellular smartphones, tablets, IoT (Internet of Things) devices, that are requiring a deep penetration in the buildings or automotive of electromagnetic field for indoor coverage, even at high spectrum frequencies up to 30-40 GHz. Such devices may include cellular transceivers, wireless local area network ("wi-fi") transceivers, Global Positioning System (GPS) receivers, Bluetooth transceivers and, in some cases, other RF receivers (e.g., FM/AM radio, UHF, etc.). As the popularity of such devices has grown, the importance of being able to use RF-based features within the confines of modern commercial buildings has grown.

In addition, in order to increase the speed and capacity of wireless communication, frequency bands to be used are becoming higher, like the frequency bands for the 5th generation mobile communication system (5G). Therefore, even if a high-frequency electromagnetic wave having a broadband frequency band is used for a mobile communication, etc., it is necessary to have a wide band frequency selective surface in order to ensure the transmission of waves with different frequencies through the glazing unit.

The ITU IMT-2020 specification demands speeds up to 20 Gbps, achievable with wide channel bandwidths and massive MIMO 3rd Generation Partnership Project (3GPP) is going to submit 5G NR (New Radio) as its 5G communication standard proposal. 5G NR can include lower frequencies, below 6 GHz, and mmWave, above 15 GHz. However, the speeds and latency in early deployments, using 5G NR software on 4G hardware (non-standalone), are only slightly better than new 4G systems, estimated at 15% to 50% better. On top of that, IoT will requires indoor coverage as better as possible not for massive MTC (Machine Type Communication) but for critical MTC where robots or industrial devices are 5G wireless remotely controlled.

An object of one embodiment of the present invention is to provide a glazing unit capable of increasing the transmission of waves with lower frequencies, below 6 GHz, and mmWave, above 15 GHz through the glazing unit. In the middle gap bands, the usage is not planned for Mobile application from the latest WARC decisions.

SUMMARY OF INVENTION

It is an object of the present invention to alleviate these problems and especially the outdoor to indoor and/or the indoor to outdoor penetration, and to provide a glazing unit capable of increasing the transmission of waves with lower frequencies, below 6 GHz, and mmWave, above 15 GHz reducing the loss attenuation level for both H or V polarization of at most −10 decibels (dB) depending the indoor shaping of the building or automotive and shall be intended as an improvement.

According to a first aspect of the invention, the invention relates to an improved a glazing unit comprising a glass panel which is low in reflectance for RF radiation, a coating system which is high in reflectance for RF radiation disposed on the said glass panel. The invention can be used to implement also different devices like bandpass filters with scattering, resonators, multiband filters depending from the needs and geographical position of the building or the automotive for example. The glazing unit also comprises at least one frequencies selective decoated portion of the coating system extending along a plane, P, defined by a longitudinal axis, X, and a vertical axis, Z; having a width, DW, measured along the longitudinal axis, X, and a length, DL, measured along the vertical axis, Z and creating onto the glazing unit a dual band bandpass filter.

The at least one frequencies selective decoated portion comprises a first decoated element comprising a plurality of unit cells forming a regular grid.

The at least one frequencies selective decoated portion further comprises a plurality of second decoated elements wherein a second decoated element is placed in each unit cell of the first decoated element and wherein no second decoated element is in contact with the first decoated element.

The solution as defined in the first aspect of the present invention is based on the second decoated elements comprising at least:
- a first segment AB wherein the point B is a free termination,
- a second segment CD wherein the point D is a free termination,
- an intersection point E between the first segment AB and the second segment CD forming sub-segments AE, EB, CE and ED wherein:
  - the length, $\overline{EB}$, of the sub-segment EB is less than the length, $\overline{AE}$, of the sub-segment AE and higher than 0 ($0<\overline{EB}<\overline{AE}$),
  - the length, $\overline{ED}$, of the sub-segment ED is less than the length, $\overline{CE}$, of the sub-segment CE and higher than 0 ($0<\overline{ED}<\overline{CE}$).

According to the invention, lengths of sub-segments AE and CE are such $\overline{AE}+\overline{CE}=n\lambda/2$ wherein n is a positive integer greater than 0.

In some embodiments, the second decoated element further comprises more than or equal to one additional segment and interactions points between segments. Each segment has one interaction point with another segment and each segment has at most two intersection points preferably each segment has two interaction points with two different other segment to form a closed shape.

In preferred embodiments, the second decoated element comprises two additional segments:
- a third segment FG wherein the point F is a free termination and an intersection point H between the third segment FG and the second segment CD forming sub-segments FH, HG, CH, HE and ED wherein the length, $\overline{HG}$, of the sub-segment HG is less than the length, $\overline{FH}$, of the sub-segment FH and higher than 0 ($0<\overline{HG}<\overline{FH}$) and
- a fourth segment IJ wherein the point I is a free termination and an intersection point K between the four segment IJ and the third segment FG forming sub-segments IK, KJ, FK, KH and HG wherein the length, $\overline{KJ}$, of the sub-segment KJ is less than the length, $\overline{IK}$, of the sub-segment IK and higher than 0 ($0<\overline{KJ}<\overline{IK}$) forming central sub-segments and lateral sub-segments.

Preferably, the sum of lengths of longest lateral sub-segments of segments having only lateral sub-segments added to the length of central sub-segments of segments having a central sub-segment equals to $n\lambda/2$ wherein n is a positive integer greater than 0. For example, lengths of sub-segments AE, EH, HJ and IK are such $\overline{AE}+\overline{EH}+\overline{HJ}+\overline{IK}=n\lambda/2$ wherein n is a positive integer greater than 0.

According to the invention, and as explained hereunder, length of lengths of sub-segments and/or central segments can be smaller $n\lambda/2$ wherein n is a positive integer greater than 0 to have a low reflectance at the desire frequency because the invention improve the RF transparency and enlarge the bandwidth around the desire frequency even if a frequency shift occurs.

In some embodiments, the second decoated element comprises a fourth segment IJ wherein the point I is a free termination, an intersection point K between the four segment IJ and the third segment FG forming sub-segments IK, KJ, FK, KH and HG wherein the length, $\overline{KJ}$, of the sub-segment KJ is less than the length, $\overline{IK}$, of the sub-segment IK and higher than 0 ($0<\overline{KJ}<\overline{IK}$) and an intersection point L between the four segment IJ and the first segment AB forming sub-segments AL, LE, EB, IL, LK and KJ wherein the length, $\overline{KJ}$, of the sub-segment KJ is less than the length, $\overline{KL}$ $\overline{LK}$, of the sub-segment K and higher than 0 ($0<\overline{KJ}<\overline{LK}$). Preferably, the sum of the lengths of central sub-segments (sub-segments between intersection points), representing a closed structure, is equal to $n\lambda$ wherein n is a positive integer greater than 0 ($\overline{LE}+\overline{EH}+\overline{HK}+\overline{KL}=n\lambda$).

In some preferred embodiment, at least one angle formed by the intersection of two segment is 90°.

In some more preferred embodiment, each unit cell of first decoated element is a regular square with sides in X and Z axis to form a regular squared grid decoated element.

In some preferred embodiment, at least one segment of the second decoated elements is substantially parallel to one side of the unit cells of the first decoated element.

In some embodiments, the glass panel comprises at least one glass sheet.

In some embodiments, the glass panel comprises two glass sheets separated by a spacer In some embodiments, the glass panel comprises two glass sheets laminated together by at least one interlayer.

According to the invention, the invention relates also to a method for manufacturing a glazing unit according to the invention comprising steps of
A. removing a part of the at least one frequencies selective decoated portion by laser ablation to form a first dimension of the first decoated element
B. removing a part of the at least one frequencies selective decoated portion by laser ablation to form a second dimension of the first decoated
C. In case of the first decoated element has more than two dimensions, repeat step B as many time as the first decoated element has dimensions
D. removing a part of the at least one frequencies selective decoated portion by laser ablation the first segment of the plurality of second decoated elements in order to.
E. removing a part of the at least one frequencies selective decoated portion by laser ablation a second segment of the plurality of second decoated elements
F. In case of a second decoated element has more than two segments, repeat step B as many time as the second decoated element has segments in addition to the first two segments.

According to the invention, the invention relates also to a method for manufacturing a glazing unit wherein
the unit cells of first decoated element are a regular squares with sides in X and Z axis to form a regular squared grid first decoated element,
the plurality of second decoating elements comprises four segments with two segments substantially parallel to the X-axis and to one side of the first decoated element and two segments substantially perpendicular to the two other segments and four intersection points, wherein each section has three sub-segments, one central sub-segment and two lateral sub-segments, and each central sub-segment of each segment has substantially the same length than the other central sub-segments, comprising the steps of:
A. removing a portion of the coating by laser ablation to form a first line in the X-axis of the first decoated element,
B. repeating the step A to provide all lines in the X-axis of the first decoated element.
C. removing a portion of the coating by laser ablation to form a first line in the Z-axis of the first decoated element,
D. repeating the step C to provide all lines in the Z-axis of the first decoated element.

E. removing a portion of the coating by laser ablation to form a first discontinued line in the X-axis in order to create a first segment in the X-axis of the second decoated elements,
F. removing a portion of the coating by laser ablation to form a second discontinued line in the X-axis adjacent to the first discontinued line in order to create a second segment in the X-axis of the second decoated elements,
G. repeating the step E and F to provide all segments in the X-axis of second decoated elements.
H. removing a portion of the coating by laser ablation to form a first discontinued line in the Z-axis in order to create a first segment in the Z-axis of the second decoated elements,
I. removing a portion of the coating by laser ablation to form a second discontinued line in the Z-axis adjacent to the first discontinued line in order to create a second segment in the Z-axis of the second decoated elements,
J. repeating the step H and I to provide all segments in the Z-axis of second decoated elements.

In some preferred embodiments, steps E and F can be executed before step B in order to optimize the time and the laser path in the X-axis.

In some preferred embodiments, steps H and I can be executed before step D in order to optimize the time and the laser path in the Z-axis.

According to the invention, steps A, B, E, F and G can be made in the Z-axis and then steps C, D, H, I and J in the X-axis.

It is noted that the invention relates to all possible combinations of features recited in the claims or in the described embodiments.

The following description relates to an building window unit but it's understood that the invention may be applicable to others fields like automotive or transportation windows which have to be attached such as train.

BRIEF DESCRIPTION OF DRAWINGS

This and other aspects of the present invention will now be described in more detail, with reference to the appended drawings showing various exemplifying embodiments of the invention which are provided by way of illustration and not of limitation. The drawings are a schematic representation and not true to scale. The drawings do not restrict the invention in any way. More advantages will be explained with examples.

DESCRIPTION OF EMBODIMENTS

Figure 1:
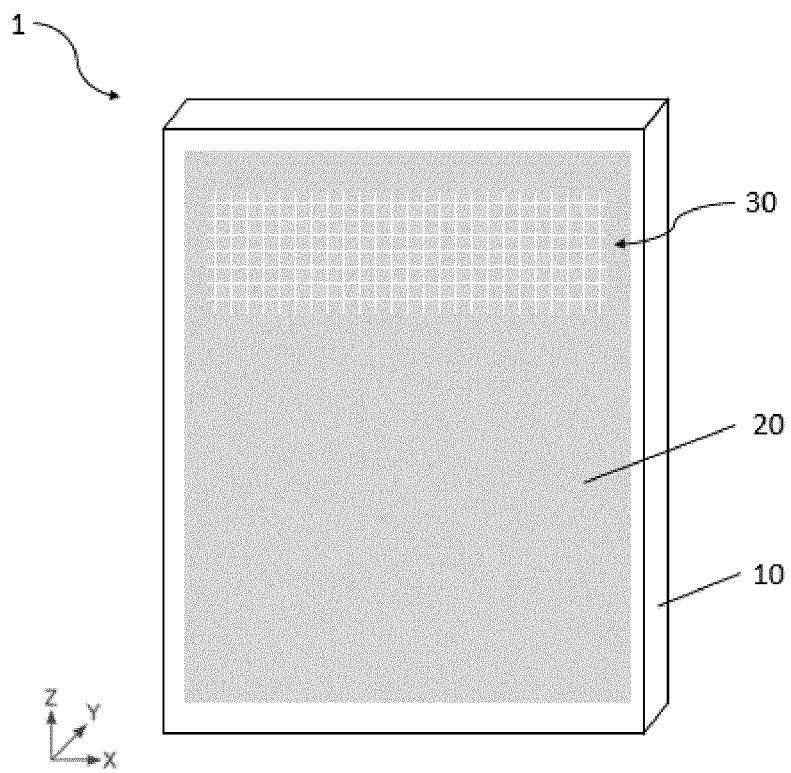
FIG. 1 is a schematic view of a glazing unit according to an exemplifying embodiment of the present invention.
Figure 2:
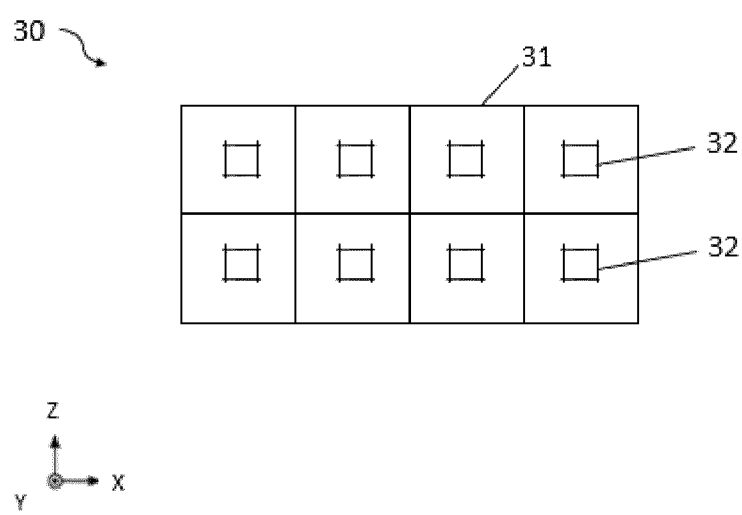
FIG. 2 is a schematic view of frequencies selective decoated portion of the coating system according to the invention.

For a better understanding, the scale of each member in the drawing may be different from the actual scale. In the present specification, a three-dimensional orthogonal coordinate system in three axial directions (X axis direction, Y axis direction, Z axis direction) is used, the width direction of the frequencies selective decoated portion is defined as the X direction, the thickness direction is defined as the Y direction, and the height is defined as the Z direction. The direction from the bottom to the top of the frequencies selective decoated portion is defined as the +Z axis direction, and the opposite direction is defined as the −Z axis direction. In the following description, the +Z axis direction is referred to as upward and the −Z axial direction may be referred to as down.

With reference to FIG. 1, a first embodiment of the present invention is described.

As shown in FIG. 1, a glazing unit 1 comprises a glass panel 10 which is low in reflectance for RF radiation, a coating system 20 which is high in reflectance for RF radiation disposed on the said glass panel. The glazing unit further comprises at least one frequencies selective decoated portion 30 of the coating system extending along a plane, P, defined by a longitudinal axis, X, and a vertical axis, Z; having a width, DW, measured along the longitudinal axis, X, and a length, DL, measured along the vertical axis, Z.

In some embodiments, the glass panel 10 is at least transparent for visible waves in order to see-through and to let light passing through.

In some preferred embodiments, the glass panel 10 comprises at least one glass sheet.

In some preferred embodiments, the glass panel 10 comprises at least two glass sheets separated by a spacer allowing to create a space filled by a gas like Argon to improve the thermal isolation of the glass panel, creating an insulating glazing panel.

In the present embodiment, the rectangle includes not only a rectangle or a square but also a shape obtained by chamfering corners of a rectangle or a square. The shape of the glass panel 10 in a plan view is not limited to a rectangle, and may be a circle or the like.

In another embodiment, the glass panel can be a laminated glass panel to reduce the noise and/or to ensure the penetration safety. The laminated glazing comprises glass panels maintained by one or more interlayers positioned between glass panels. The interlayers employed are typically polyvinyl butyral (PVB) or ethylene-vinyl acetate (EVA) for which the stiffness can be tuned. These interlayers keep the glass panels bonded together even when broken in such a way that they prevent the glass from breaking up into large sharp pieces.

In some embodiments, when the glass panel comprises several glass sheets, different or same coating system can be placed on different surface of different glass sheets. Preferably, every coating system has at least one frequencies selective surface and more preferably, every of same at least one frequencies selective surface are in front of each other.

As the material of the glass panel 10, for example, soda-lime silica glass, borosilicate glass, or aluminosilicate glass can be mentioned or other materials such as thermoplastic polymers, polycarbonates are known, especially for automotive applications, and references to glass throughout this application should not be regarded as limiting.

The glass panel 10 can be manufactured by a known manufacturing method such as a float method, a fusion method, a redraw method, a press molding method, or a pulling method. As a manufacturing method of the glass panel 10, from the viewpoint of productivity and cost, it is preferable to use the float method.

The glass panel 10 can be flat or curved according to requirements by known methods such as hot or cold bending.

The glass panel 10 can be processed, ie annealed, tempered, . . . to respect with the specifications of security and anti-thief requirements.

The glass sheet can be a clear glass or a coloured glass, tinted with a specific composition of the glass or by applying an additional coating or a plastic layer for example.

In case of several glass sheets, in some embodiments, each glass sheet can be independently processed and/or coloured, . . . in order to improve the aesthetic, thermal insulation performances, safety, . . . .

The thickness of the glass panel 10 is set according to requirements of applications.

The glass panel 10 can be formed in a rectangular shape in a plan view by using a known cutting method. As a method of cutting the glass panel 10, for example, a method in which laser light is irradiated on the surface of the glass panel 10 to cut the irradiated region of the laser light on the surface of the glass panel 10 to cut the glass panel 21, or a method in which a cutter wheel is mechanically cutting can be used. The glass panel can have any shape in order to fit with the application, for example a windshield, a sidelite, a sunroof of an automotive, a lateral glazing of a train, a window of a building, . . . .

In addition, the glazing unit 10 can be assembled within a frame or be mounted in a double skin façade, in a carbody or any other means able to maintain a glazing unit. Some plastics elements can be fixed on the glazing panel to ensure the tightness to gas and/or liquid, to ensure the fixation of the glazing panel or to add external element to the glazing panel.

Low in reflectance for RF radiation means that RF radiation are mostly transmitted through the material where high in reflectance for RF radiation means that RF radiation are mostly reflected on the surface of the material and/or absorbed by the material and the attenuation is at level of 20 decibels (dB) or more. Low in reflectance means an attenuation at level of 10 decibels (dB) or less. The coating system which is high in reflectance for RF radiation means that the coating system is non-transmitting to RF radiation.

According to the invention, the coating system 20 can be a functional coating in order to heat the surface of the glazing panel, to reduce the accumulation of heat in the interior of a building or vehicle or to keep the heat inside during cold periods for example. Although coating system are thin and mainly transparent to eyes.

The coating system 20 can be made of layers of different materials and at least one of this layer is electrically conductive. The coating system is electrically conductive over the majority of one major surface of the glazing panel.

The coating system 20 of the present invention has an emissivity of not more than 0.4, preferably less than 0.2, in particular less than 0.1, less than 0.05 or even less than 0.04. The coating system of the present invention may comprise a metal based low emissive coating system; these coatings typically are a system of thin layers comprising one or more, for example two, three or four, functional layers based on an infrared radiation reflecting material and at least two dielectric coatings, wherein each functional layer is surrounded by dielectric coatings. The coating system of the present invention may in particular have an emissivity of at least 0.010. The functional layers are generally layers of silver with a thickness of some nanometres, mostly about 5 to 20 nm. Concerning the dielectric layers, they are transparent and traditionally each dielectric layer is made from one or more layers of metal oxides and/or nitrides. These different layers are deposited, for example, by means of vacuum deposition techniques such as magnetic field-assisted cathodic sputtering, more commonly referred to as "magnetron sputtering". In addition to the dielectric layers, each functional layer may be protected by barrier layers or improved by deposition on a wetting layer.

For example, the coating system 20 is applied to the glazing unit 1 to transform it to a low-E glazing unit. This metal-based coating system such as low-E or heatable coating systems.

In some embodiment, the coating system 20 can be a heatable coating applied on the glazing unit to add a defrosting and/or a demisting function for example.

As the coating system, for example, a conductive film can be used. As the conductive film, for example, a laminated film obtained by sequentially laminating a transparent dielectric, a metal film, and a transparent dielectric, ITO, fluorine-added tin oxide (FTO), or the like can be used. As the metal film, for example, a film containing as a main component at least one selected from the group consisting of Ag, Au, Cu, and Al can be used.

Preferably, the coating system is placed on the majority of one surface of the glazing unit and more preferably on the whole used surface of the glazing panel.

In some embodiments, a masking element, such as an enamel layer, can be add on a part of the periphery of the glazing unit.

A simple approach to this problem of RF energy reflection is to remove a portion of the coating system to avoid to have a high reflectance for RF radiation. This approach, however, reduces the solar control benefits offered by the glazing unit and for equipment located inside the building, the vehicle or the car, the region would be unacceptably large. On top of that, the transition between the decoated portion and the coating itself is eye-visible and usually non-accepted by users.

Another solution has been to cut lines in the coating system to create a surface which is frequency selective, that is, it has relatively high reflectivity/absorbance for solar energy but relatively low in the RF region of the electromagnetic spectrum. The cutting may be performed by laser ablation and the spacing of the slits is chosen to provide selectivity at the desired frequency.

To solve these problems, the invention is based on the at least one frequencies selective decoated portion of the coating system comprising a first decoated element comprising a plurality of unit cells forming a regular grid and a plurality of second decoated elements wherein a second decoated element is placed in each unit cell of the first decoated element and wherein no second decoated element is in contact with the first decoated element.

According to the invention, the at least one frequencies selective decoated portion of the coating system may be a series or pattern of intersecting ablated paths may be created in the coating system, while leaving behind the coating system in untouched areas and only a very small percentage of the area of the coating system is removed from the glazing panel, and most of the coated glass remains untouched to keep performances of the coating system.

These paths are produced in such a way as to create areas of the coating system that are electrically isolated allowing the glazing panel to retain most of its energy conserving properties or heatable properties, while the ablated paths allow passage of RF signals through the glazing panel.

In various embodiments, paths can be made by pulse laser to create spots. The diameter of the spot is about 20-25 um, so that each path will be approximately this width. In alternative embodiments, different sized spots (e.g., 10-200 microns in diameter) and paths may be used. Moreover, the spots overlap and the amount of overlap may be approximately 50% by area; the extent of overlap may vary in alternative embodiments. In some embodiments, the overlap may range from 25% to over 90% for example. The pattern of ablated intersecting paths may be varied.

According to the invention, the first decoated element is a regular grid with grid-like pattern formed by a plurality of interconnected unit cells. Unit cell is the smallest and closed building block whose geometric arrangement defines the regular grid.

The plurality of unit cells of the regular grid may have several shapes as long as unit cells are connected to each other meaning that at least a part of paths that create unit cells is used to create multiple unit cells.

In some embodiments, unit cells have a rectangular-like shape, and preferably a square-like shape. In these embodiments, a side of a unit cell is used to create the adjacent unit cell in order to create a rectangular-like grid, preferably a square-like grid.

According to the invention, unit cells are not limited to rectangular or square shapes and may have any pattern that enhances transmission of desired RF signals of a particular polarization.

The pattern of unit cells can be a honeycomb pattern where sides of honeycomb are used for adjacent unit cells.

The pattern may also be a circle pattern. In these embodiments, circular unit cells are tangentially connected to adjacent unit cells meaning that each circle is touching the adjacent circle by a single point.

In a first decorating element, no particular unit cells is necessarily superior to another and preferably, all unit cells have same dimensions.

In some embodiments, the decoated area of a coated system may be 3% or less of the total coated area depending of the application, the material used in the glazing unit, . . . . In other embodiments, a different percentage may be used (e.g. 5% or less total area of the coating system removed, and 95% total area of a coating system retaining untouched). In other embodiments, the coated system is decoated on at least one portion of his surface, this decoated portion represents less than 2% of the coating. In others embodiments, several decoated portion can be present and the decoated surface is at most 3% of the total coated area.

Note that while ablation of a higher percentage of the area may improve the transmission of RF signals through the glazing unit, ablation of more of the coating system diminishes the energy conserving properties heatable performances of the glazing unit.

In some embodiments, the grid spacing can be range from 2-10 mm. In general, smaller isolated areas of coating system facilitate improved RF transmission at shorter wavelengths, whereas larger overall size of the entire ablated pattern tends to facilitate longer wavelengths. Patterns that need to allow or transmission of multiple RF frequencies, while providing maximum transmission across all those frequencies, may have an overall ablation area dictated by the longer wavelengths while simultaneously having the grid/line spacing dictated by the shorter wavelengths.

According to the invention, the dimension of the at least one frequencies selective decoated portion depends from the outdoor and/or indoor field intensity and incidence angle and/or from the application.

In some embodiments, the dimensions at least one frequencies selective decoated portion are DW and DL may be comprised in the range of 5 to 70 cm, for example DW×DL or DL×DW can be 10×5 cm, 10×10 cm, 15×15 cm, 40×20 cm or 70×30 cm.

The overall area of the pattern may vary in different embodiments. Complex decoating portions might be used to extend the bandwidth implementing multiband filters.

Figure 3:
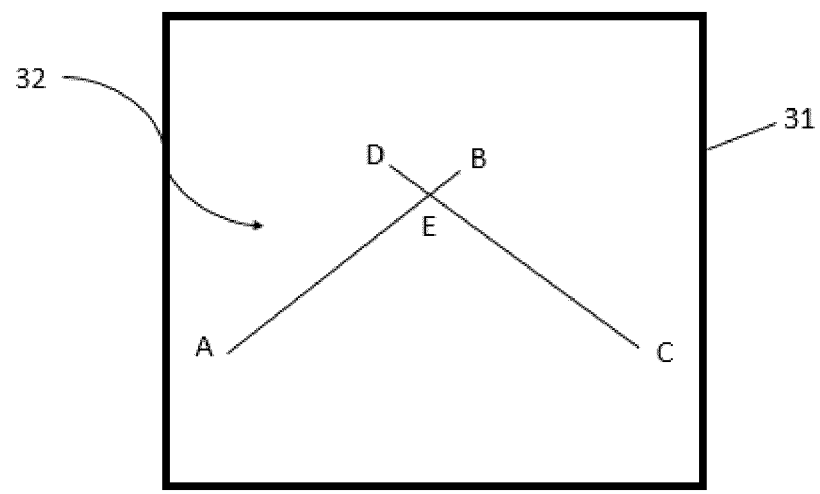
FIGS. 3 to 8 are schematic views of embodiments of a second decoated element of the frequencies selective decoated portion according to the invention.

According to the invention and as shown in FIG. 3, the second decoated elements 32 comprise at least:
  a first segment AB wherein the point B is a free termination,
  a second segment CD wherein the point D is a free termination,
  an intersection point E between the first segment AB and the second segment CD forming sub-segments AE, EB, CE and ED wherein the length, $\overline{EB}$, of the sub-segment EB is less than the length, $\overline{AE}$, of the sub-segment AE and higher than 0 ($0<\overline{EB}<\overline{AE}$) and the length, $\overline{ED}$, of the sub-segment ED is less than the length, $\overline{CE}$, of the sub-segment CE and higher than 0 ($0<\overline{ED}<\overline{CE}$).

According to the invention, there is no contact between the second decoated element 32 and the first decoated element 31 represented, but not limited to, by a square unit cell of the first decoated element allowing to avoid a direct coupling between the first decoated element and second decoated elements.

According to the invention, more than one second decoated element may be in a same unit cell. These second decoated elements are not in contact each other or with the unit cell of the first decoated element. These more than one second decoated element may have different length in order to optimize the RF transparency for different frequencies.

According to the invention, no second decoated element is in contact with the first decoated element meaning that paths to create second decoated element is not touching paths to create first decoated element. The coating system between the second decoated element and the first decoated element is untouched.

According to the invention, a segment is a part of a line that is bounded by two distinct end points and may be a straight segment or a curved segment, such as a part of a sinusoidal-like line.

According to the invention, a sub-segment is part of a segment that is bounded by two distinct end points of the said segment.

According to the invention, a free termination is an end-point without any other segment intersecting this said end-point.

According to the invention, a central sub-segment is a part of a segment that is bounded by two distinct end points of the said segment and these said two distinct end points are intersection points with other segments.

According to the invention, a lateral sub-segment is a part of a segment that is bounded by two distinct end points of the said segment and one of these said two distinct end points is a free termination and the other distinct end-point is an intersection point with another segment.

Preferably, every segment has two free terminations to create lateral sub-segments.

According to the invention, the length of a segment or a sub-segment is the distance, following the line of the segment or sub-segment, between the two two distinct end points and written with a overline over the segment or sub-segment endpoints such as the length of a segment XY is $\overline{XY}$.

According to the invention and as shown in FIG. 3, in some embodiments, the length of sub-segments AE and EC of second decoated element is equals $n\lambda/2$ wherein n is a positive integer greater than 0. Lambda ($\lambda$) is the wavelength of the desire RF radiation at the interface with the glazing unit.

Surprisingly, lateral sub-segments of the second decoated element ED and EB improve the transmission of RF radiation thought the glazing unit by enlarging the bandwidth.

According to the invention, the angle formed by segments can vary from, non-comprised, 0° to, non-comprised, 360° as long as segments are distinct meaning that an angle of a multiple of 0°, 180° or 360° is not possible to obtain distinct segments or distinct sub-segments.

According to the invention, at least two segments of the second decoated element have lateral sub-segments. Preferably, all segments have lateral sub-segment in order to improve the width of the passing band.

According to the invention and as shown in FIGS. 4 to 8, the second decoated element 32 comprises more than or equal to one additional segment, GF, IJ and/or MN, meaning that the second decoated element comprises at least three segments. Each segment has one interaction point with another segment meaning that two segments can have only one interaction point between these said two segments. Preferably, each segment has at most two intersection points meaning that a segment can intersect at most two different segments.

In some preferred embodiments, each segment has two interaction points with two different other segments to form a closed shape such as a polygon, for example a triangle with three segments, a rectangle, a square or a diamond with four segments, a pentagon with five segments, an honeycomb with six segments, or an polygon with different shape, lengths of segments and angles between segments.

Figure 4:
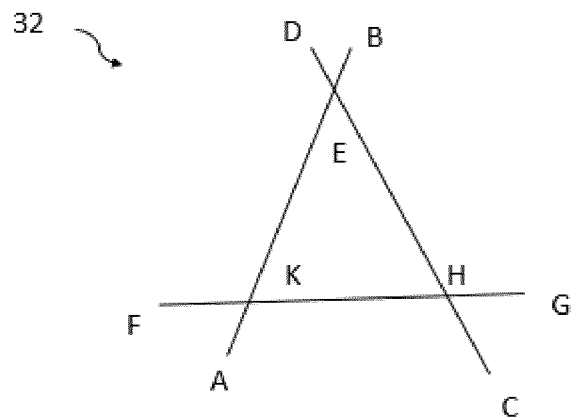

In some embodiments, as shown in FIG. 4, the second decoated element 32 has a triangle shape formed by three central sub-segments KE, EH and HK.

In some preferred embodiments, the length of central sub-segments KE and EH and HK of second decoated element 32 is equals $n\lambda/2$ wherein n is a positive integer greater than 0.

Surprisingly, lateral sub-segments of the second decoated element AK, FK, ED, BE, HG and HC improve the transmission of RF radiation thought the glazing unit by enlarging the passing band.

Figure 5:
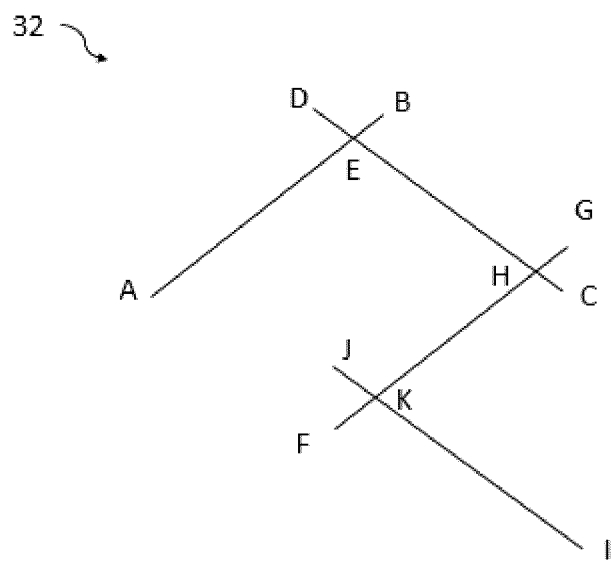

In some embodiments, as shown in FIG. 5, the second decoated element 32 has a four segments, AB, CD, FG and IJ, forming a snake-like shape. In these embodiments, two segments have two intersections points, E and H and H and K. These two segments have a central segment, respectively EH and HJ, and two lateral sub-segments, respectively DE and HC and GH and KF. The two others segments have one intersection points, E and K. These two other segments have two lateral sub-segments, respectively AE and BE and JK and KI.

In some preferred embodiments, the length, $\overline{AE}$ and $\overline{KI}$, of longest sub-segment, AE and KI, of the two segments having only two lateral sub-segments added to the length, $\overline{EH}$ and $\overline{HK}$, of the two central sub-segments KE and EH and HK is equals $n\lambda/2$ wherein n is a positive integer greater than 0 ($\overline{AE}+\overline{EH}+\overline{HK}+\overline{KI}=n\lambda/2$). In case of more than four segments with a general snake-like shape, preferably, the length, of longest sub-segment of all segments having only two lateral sub-segments added to the length of all central sub-segments is equals $n\lambda/2$ wherein n is a positive integer greater than 0

Surprisingly, smallest lateral sub-segments (DE, BE, GH, CH, JK and FK) of segments of the second decoated element 32 improve the transmission of RF radiation thought the glazing unit by enlarging the passing band.

Figure 6:
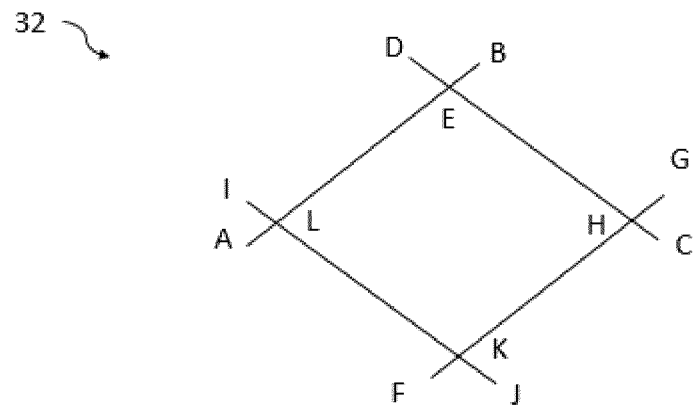

In some embodiments, as shown in FIG. 6, the second decoated element 32 has a four segments, AB, CD, FG and IJ, forming a quadrilateral. In these embodiments with four intersections points between segments, E H, K and L. These four segments have a central segment, respectively LE, EH and HK and KL, and two lateral sub-segments, respectively AL, IL, DE, EB, GH, CH, KJ and KF. According to the invention, the length of central sub-segments may be different such as angles formed between segments.

In some preferred embodiments, the length, $\overline{LE}$, $\overline{EH}$, $\overline{HK}$ and $\overline{KL}$, of all central sub-segments (LE, EH, HK and KL), forming a closed structure, of a second decoated element is equals $n\lambda$ wherein n is a positive integer greater than 0 ($\overline{LE}+\overline{EH}+\overline{HK}+\overline{KL}=n\lambda$).

Surprisingly, smallest lateral sub-segments (AL, IL, DE, EB, GH, CH, JK and FK) of segments of the second decoated element 32 improve the transmission of RF radiation thought the glazing unit by enlarging the passing band.

Figure 7:
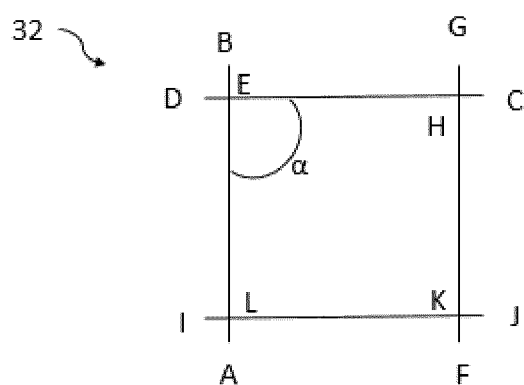

In some embodiments, as shown in FIG. 7, the second decoated element 32 has a four segments, AB, CD, FG and IJ, forming a square meaning that two segments are substantially parallel together. In these embodiments with four intersections points between segments, E H, K and L. These four segments have a central segment, respectively LE, EH and HK and KL, and two lateral sub-segments, respectively AL, IL, DE, EB, GH, CH, KJ and KF. In these embodiments, the length of central sub-segments are substantially equal and angles α formed between segments is substantially equals to 90°.

In some preferred embodiments, the length, $\overline{LE}$, $\overline{EH}$, $\overline{HK}$ and $\overline{KL}$, of all central sub-segments (LE, EH, HK and KL), forming a closed structure, of a second decoated element is equals $n\lambda$ wherein n is a positive integer greater than 0 ($\overline{LE}+\overline{EH}+\overline{HK}+\overline{KL}=n\lambda$).

Surprisingly, smallest lateral sub-segments (AL, IL, DE, EB, GH, CH, JK and FK) of segments of the second decoated element 32 improve the transmission of RF radiation thought the glazing unit by enlarging the passing band.

Figure 8:
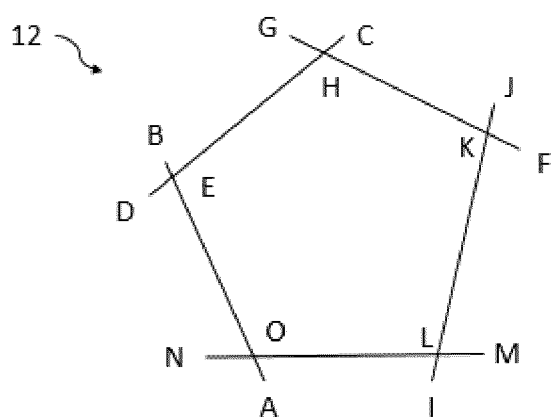

In some embodiments, as shown in FIG. 8, the second decoated element 32 has a five segments, AB, CD, FG, IJ and MN, forming a pentagon. In these embodiments with five intersections points between segments, E, H, K, L and O. These five segments have a central segment, respectively OE, EH, HK, KL and OL, and two lateral sub-segments, respectively AO, NO, DE, EB, GH, HC, JK, FK, LM, and LI. According to the invention, the length of central sub-segments may be different such as angles formed between segments and preferably the length of central sub-segments have substantially the same length and angles formed between segments are substantially equal.

In some preferred embodiments, the length, $\overline{OE}$, $\overline{EH}$, $\overline{HK}$, $\overline{KL}$ and $\overline{OL}$, of all central sub-segments (OE, EH, HK, KL and OL), forming a closed structure, of a second decoated element is equals $n\lambda$ wherein n is a positive integer greater than 0 ($\overline{OE}+\overline{EH}+\overline{HK}+\overline{KL}+\overline{OL}=n\lambda$).

Surprisingly, smallest lateral sub-segments (AO, NO, DE, EB, GH, CH, JK, FK, ML and IL) of segments of the second decoated element 32 improve the transmission of RF radiation thought the glazing unit by enlarging the passing band.

Figure 9:
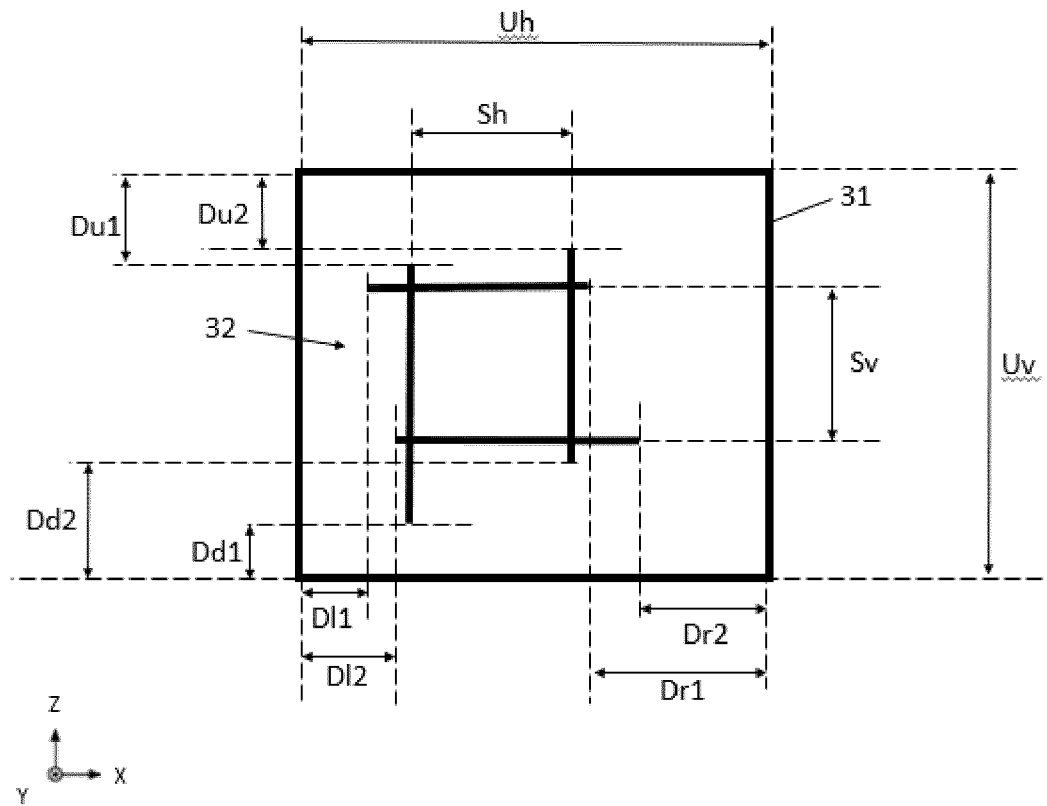
FIG. 9 is a schematic view from a second decoated element inside a unit cell of the first decoating element of the frequencies selective decoated portion according to the invention.

As shown in FIG. 9, there is no contact between a second decoated element 32 and the first decoated element 31 represented by a squared unit cell meaning that the length of sides of the unit cell is equal (Uh=Uv). The second decoated element 32 comprises four segment and four intersection point in order to create a square-like shape with equal central sub-segments (Sh=Sv). Distances between the end of segments of the second decoated element and the first decoated element are not null. In this particular example, Du1, Du2, Dd1, Dd2, Dl1, Dl2, Dr1 and Dr2 are higher than zero (Du1>0, Du2>0, Dd1>0, Dd2>0, Dl1>0, Dl2>0, Dr1>0 and Dr2>0). More preferably, the minimal distance between the end of segments of the second decoated element and the first decoated element is higher than or equals to 0.05 mm (Min(Du1, Du2, Dd1, Dd2, Dl1, Dl2, Dr1, Dr2) 0.05 mm) to avoid indirect coupling between the first decoated element and second decoated elements, and more preferably higher than 0.1 mm (Min(Du1, Du2, Dd1, Dd2, Dl1, Dl2, Dr1, Dr2)≥0.1 mm). In these particular embodiments, one segment of the second decoated elements is substantially parallel to one side of the unit cells of the first decoated element. Preferably lengths of the central sub-segments are equal such as lengths of lateral sub-segments are equal.

In some embodiments, the glazing unit comprises more than one frequencies selective decoated portion on the coating. The first decoated element and second decoated elements of each frequencies selective decoated portion may have different sizes allowing to have different bandwidth to improve the RF transparency of the glazing panel with a coating system which is high in reflectance for RF radiation according to the invention.

In some embodiments, second decoated elements of a frequencies selective decoated portion have the same dimensions meaning that second decoated elements of a frequencies selective decoated portion are substantially the same to each other in a same frequencies selective decoated portion.

In some other embodiments, dimensions of second decoated elements of a frequencies selective decoated portion are different to enlarge the bandwidth.

Figure 10:
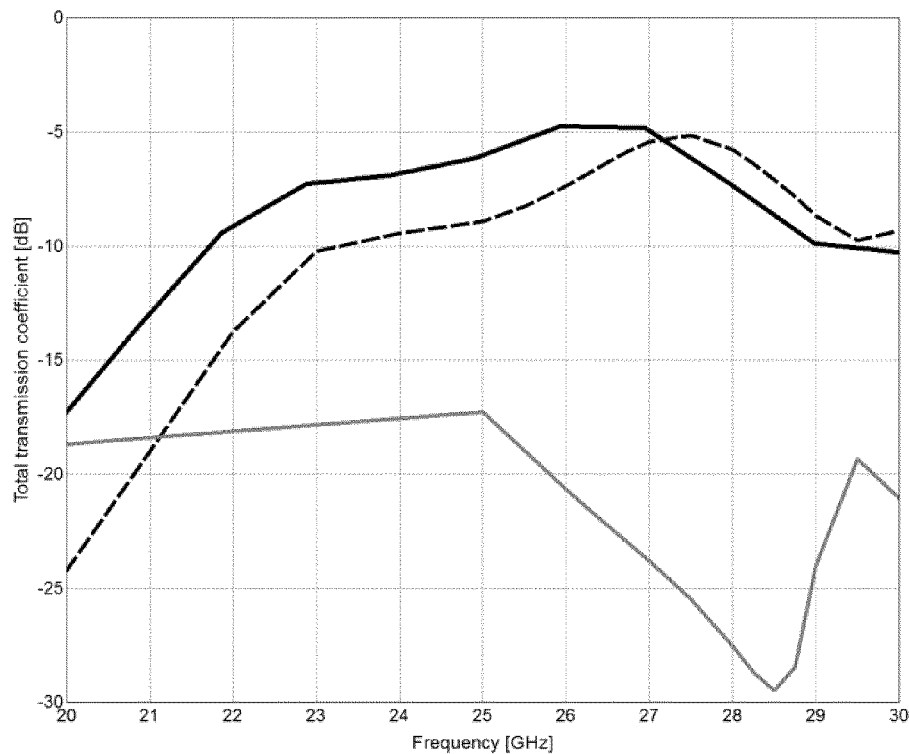
FIG. 10 is a diagram showing a simulation result of a second decoated element with and without lateral sub-segments.
Figure 11:
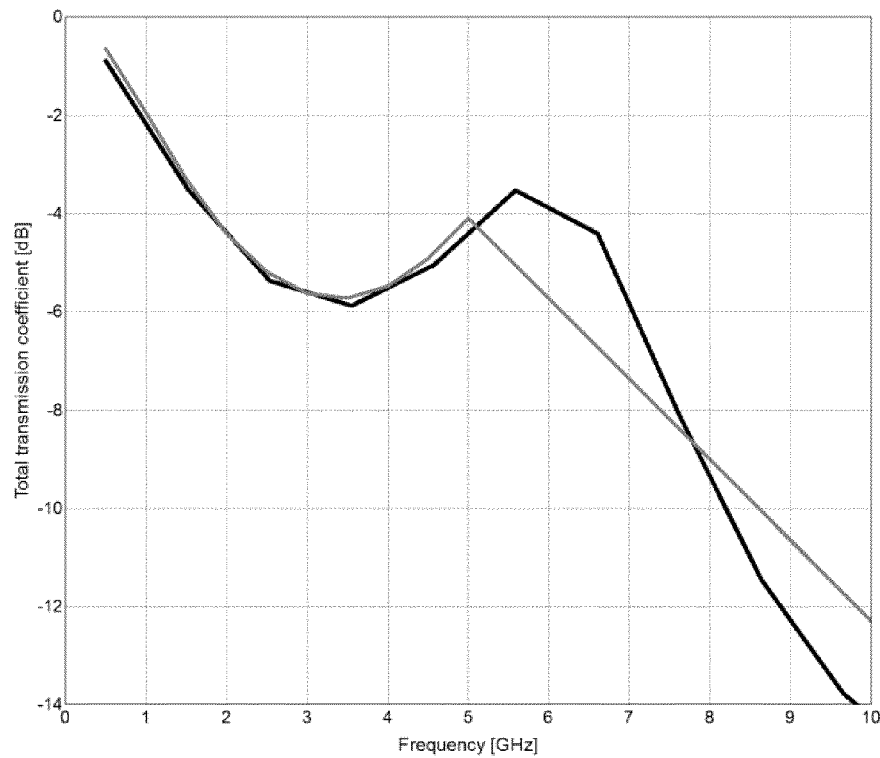
FIG. 11 is a diagram showing a simulation result of decoated portion according to the invention compared to a decoated portion with only a first decoated element.
Figure 12:
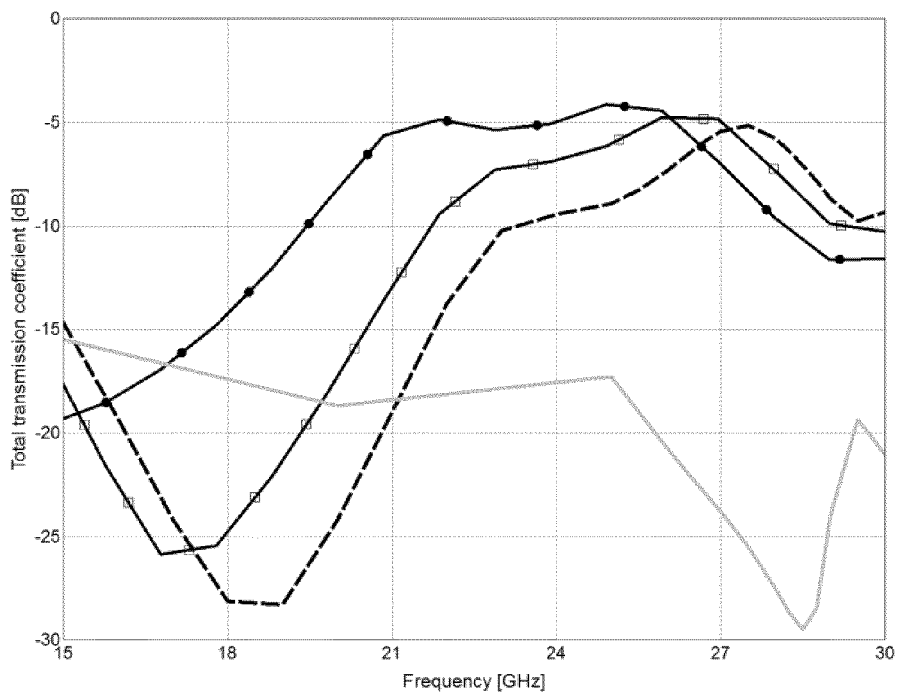
FIG. 12 is a diagram showing a simulation result of the length of the lateral sub-segments of a second decoated element.

Simulations of FIGS. 10, 11 and 12, are made for a specific embodiment, accordion the invention where the glazing unit comprises one frequencies selective decoated portion comprising a first decoated element with a square grid shape with unit cells of 4×4 mm and second decoated elements have a square shape with central sub-segments of 1.5 mm and one segment of the second decoated elements is substantially parallel to one side of the unit cells of the first decoated element as shown in FIG. 9.

FIG. 10 is a diagram showing a simulation result of a second decoated element with, according to the invention, (black solid curve) and without lateral sub-segments, as a comparative example (black dashed curve). The simulation is made for a first decoated element with a square grid shape with unit cells of 4×4 mm and second decoated elements have a square shape with central sub-segments of 1.5 mm. The grey curve represents the glazing unit with only a first decoated element meaning without second decoated element according to the invention. This first decoated element alone does not improve the RF transparency of the glazing unit for frequencies of mmWave.

FIG. 10 also shows that lateral sub-segments of the second decoated elements, according to the invention, extends the bandwidth for mmWave compared to a second decoated elements without lateral sub-segment (dashed curve). At a level of loss of 10 dB, the glazing unit according to the invention (solid curve) is RF transparent for sub-6 GHz and between around 22 GHz to 30 GHz radiations. The glazing unit according to the invention is capable of increasing the transmission of waves with lower frequencies, below 6 GHz, and mmWave, above 15 GHz through the glazing unit with attenuation level for H or V polarization of at most −10 decibels (dB).

FIG. 11 is a diagram showing a simulation result of a second decoated element in a unit cell of the first decoated element according to the invention (solid black curve) compared to the first decoated element alone (solid grey curve). The grey curve shows that the first decoated element allows a RF transparency for sub-6 GHz radiations (transmission of waves with lower frequencies) and the solid curve shows that the second decoated elements bring transparency for mmWave, in this particular example, above 22 GHz.

Surprisingly, the presence of the second decoated elements clearly improves (around 3 dB depending of the frequency) the RF transparency of the glazing unit normally due to the first decoated element for sub-6 GHz radiations. The presence of a first decoated element and second decoated elements according to the invention improve the transmission of waves for sub-6 GHz and in the same time for mmWave in the better way than a first and second decoated elements placed next to each other or having independently a first and a second decoated elements on a coating of a glazing unit. Dimensions of the second decoated elements compared to dimensions of the first decoated element, according to the invention, improve the RF transparency for a defined frequency. Due to the invention, second decoated elements improve the RF transparency of the glazing unit at the desire frequency but also improve the RF transparency of the first decoated element.

FIG. 12 is a diagram showing a simulation result of second decoated elements with different length of lateral sub-segments. The black solid curve with squares is simulated with a second decoated elements with lateral sub-segments in a unit cell of the first decoated element, according to the invention, having a length of substantially 0.225 mm. The black solid curve with spots is simulated with a second decoated elements with lateral sub-segments in a unit cell of the first decoated element, according to the invention, having a length of substantially 0.5 mm. The black dashed curve with spots is simulated with a second decoated elements without lateral sub-segments in a unit cell of the first decoated element, as a comparative example. The grey solid curve is simulated without second decoated element, as a comparative example.

Surprisingly, Higher the length of lateral sub-segments is, larger the bandwidth is. The length of 0.225 mm allows a transmission with an attenuation of 10 dB for mmWave RF radiations from around 22 GHz to 30 GHz where the length of 0.5 mm allows a transmission with an attenuation of 10 dB for mmWave RF radiations from around 19 GHz to 30 GHz with the same level of improvement for waves with lower frequencies, below 6 GHz. A enlarged bandwidth on the glazing unit according to the invention allows to use antennas that are not as robust as possible meaning that antennas can be design to emit with a certain error range regarding the desired emitted frequency (and/or reception). That allows to increase the manufacturing robustness of the antenna.

On top of that, enlarging the bandwidth allows to have a better reception of the signal inside if the glazing unit is used in a moving objet such as car, train, . . . due to Doppler effect and shifting of the frequency.

The invention allows to have several decoated portions with different dimensions of the first and second decoated elements on the glazing unit allowing to bring a wide range of frequencies transmitted through the glazing unit and avoiding any RF reflection on the glazing unit in the range of the used frequencies.

The present invention relates also to a method for manufacturing a glazing unit according to the invention comprising steps of
A. removing a part of the at least one frequencies selective decoated portion by laser ablation to form a first dimension of the first decoated element
B. removing a part of the at least one frequencies selective decoated portion by laser ablation to form a second dimension of the first decoated
C. In case of the first decoated element has more than two dimensions, repeat step B as many time as the first decoated element has dimensions
D. removing a part of the at least one frequencies selective decoated portion by laser ablation the second segment of the plurality of second decoated elements in order to.
E. removing a part of the at least one frequencies selective decoated portion by laser ablation a first segment of the plurality of second decoated elements
F. In case of a second decoated element has more than two segments, repeat step B as many time as the second decoated element has segments in addition to the first two segments.

According to the invention, dimensions of the first decoated element are different needed paths. In case of a unit cell of the first decoated element having a polygon shape, there are as many dimensions as sides of the polygon.

In some embodiments, unit cells of the first decoated element having a circular shape, steps A and B are merged and there is no step C because circle is considered as a single dimension.

As shown in FIG. 12, in some embodiments of the invention, a laser 100 removes (ablates), with a laser beam 101, the at least one frequencies selective decoated portion by different steps, first set of steps (A, B and C) creates the first decoated elements and a second set of steps (D, E and F) creates the second decoated elements.

Figure 13:
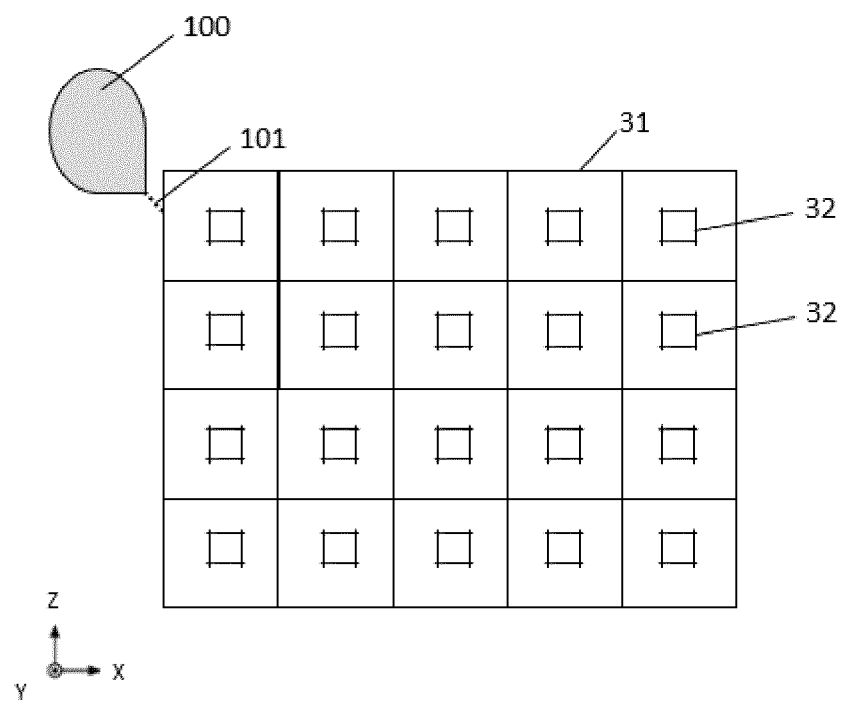
FIGS. 13 to 17 are schematic views of a method for manufacturing a glazing unit according to the invention.
Figure 14P:
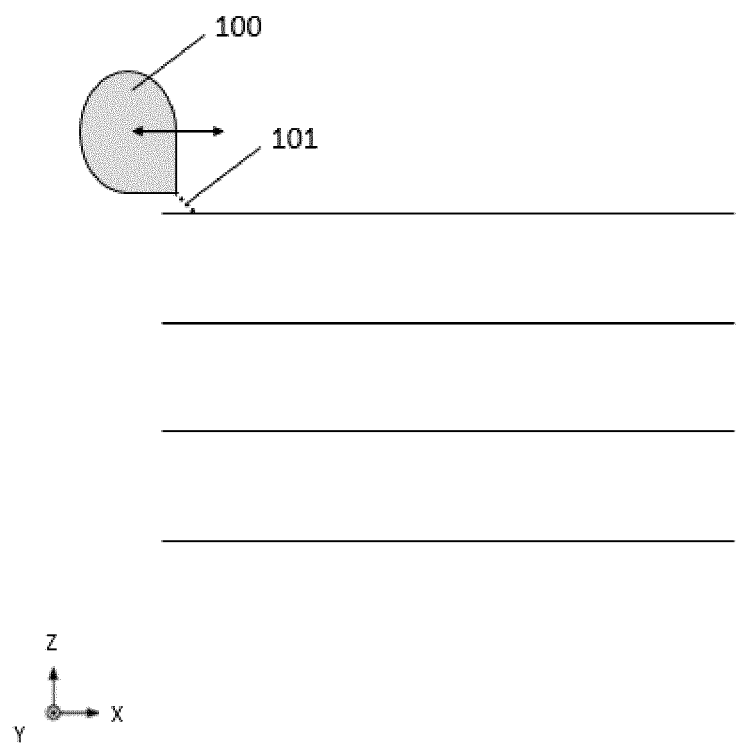
Figure 15:
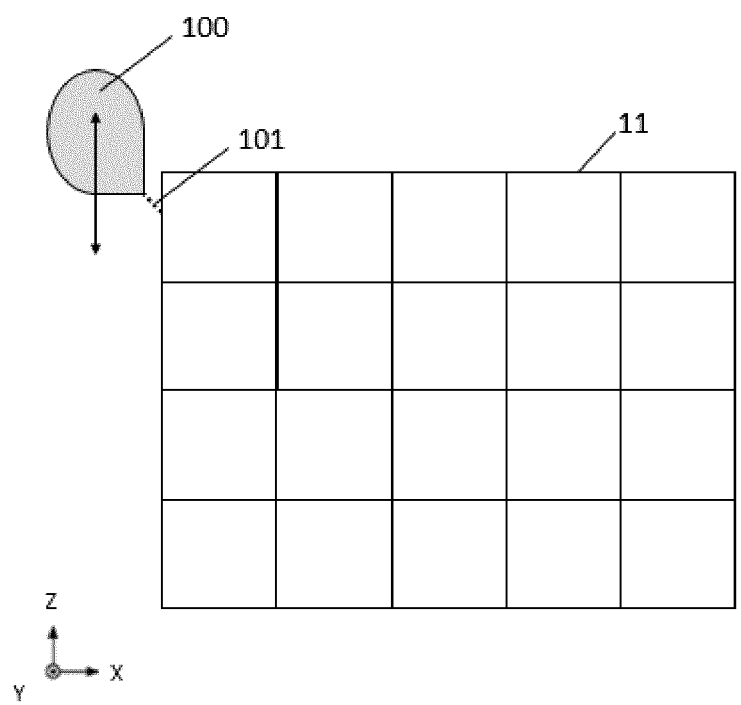
Figure 16:
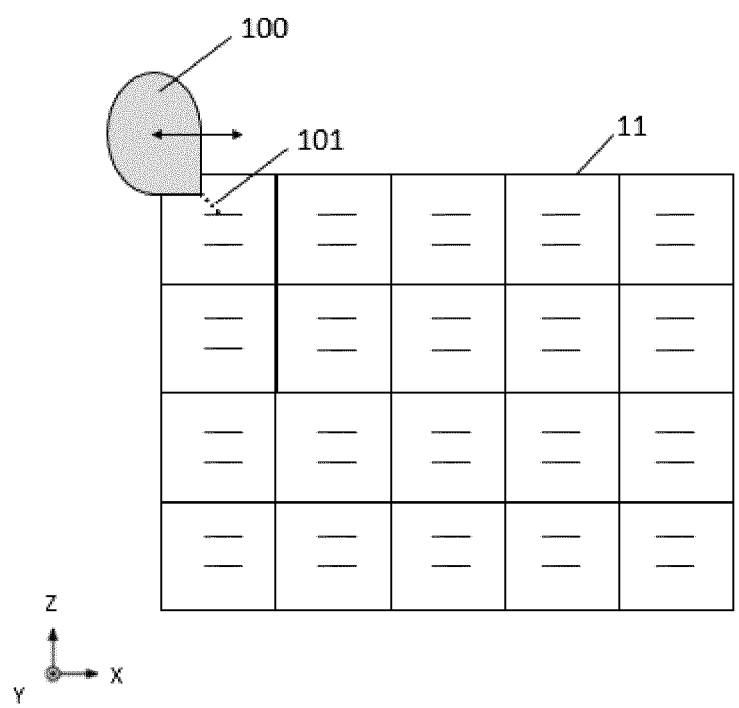
Figure 17:
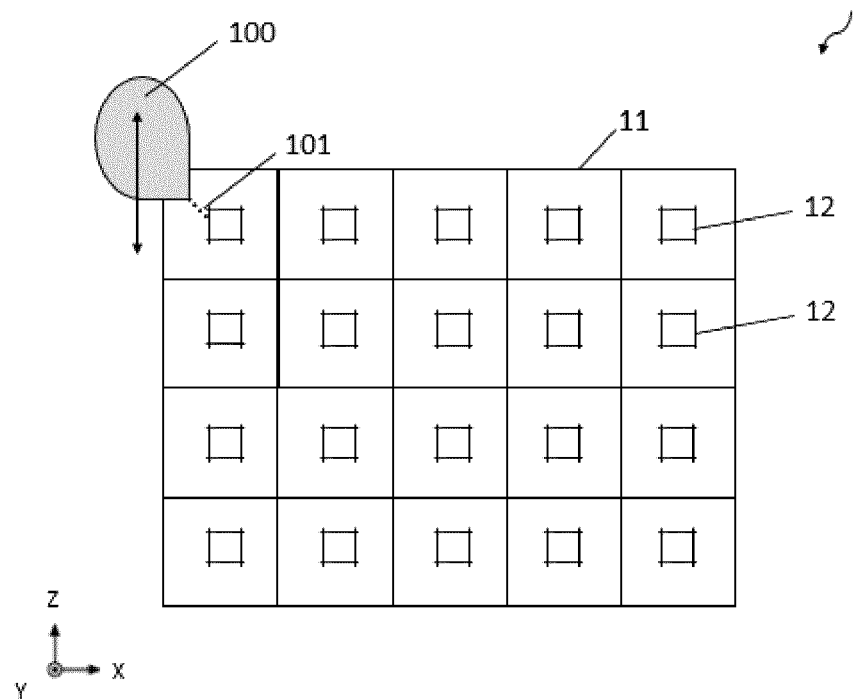

According to the invention and as shown in FIGS. 13 to 15, in some preferred embodiments where the glazing unit comprises at least one frequencies selective decoated portion comprising:
  the unit cells of first decoated element are a regular squares with sides in X and Z axis to form a regular squared grid first decoated element,
  the plurality of second decoated elements comprises four segments with two segments substantially parallel to the X-axis and to one side of the first decoated element and two segments substantially perpendicular to the two other segments and four intersection points, wherein each section has three sub-segments, one central sub-segment and two lateral sub-segments, and each central sub-segment of each segment has substantially the same length than the other central sub-segments, comprising the steps of:
A. removing a portion of the coating by laser ablation to form a first line in the X-axis of the first decoated element,
B. repeating the step A to provide all lines in the X-axis of the first decoated element.
C. removing a portion of the coating by laser ablation to form a first line in the Z-axis of the first decoated element,
D. repeating the step C to provide all lines in the Z-axis of the first decoated element.
E. removing a portion of the coating by laser ablation to form a first discontinued line in the X-axis in order to create a first segment in the X-axis of the second decoated elements,
F. removing a portion of the coating by laser ablation to form a second discontinued line in the X-axis adjacent to the first discontinued line in order to create a second segment in the X-axis of the second decoated elements,
G. repeating the step E and F to provide all segments in the X-axis of second decoated elements.
H. removing a portion of the coating by laser ablation to form a first discontinued line in the Z-axis in order to create a first segment in the Z-axis of the second decoated elements,
I. removing a portion of the coating by laser ablation to form a second discontinued line in the Z-axis adjacent to the first discontinued line in order to create a second segment in the Z-axis of the second decoated elements,
J. repeating the step H and I to provide all segments in the Z-axis of second decoated elements.

To optimize paths of the laser but also energy and time consumption, all ablation steps in one of the X or Z axis can be made in consecutive steps and then all ablation steps in the other axis (respectively Z or X axis).

Preferably, to create segments of the second decoated elements, the laser is switch ON-OFF in a single path to create all aligned segments of different second decoated elements. Another way is to mask zones where the coating must be untouched.

Figure 18:
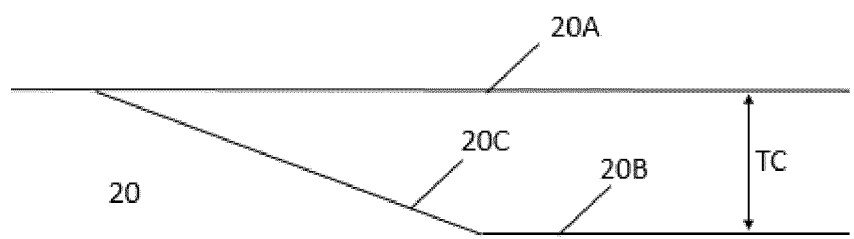
FIG. 18 shows a profile of decoating.

FIG. 18 shows a profile of a decoating in the thickness of the coating system 20 with a surface 20A opposed to the surface of the coating system in contact with the glass sheet. The thickness of the decoating TC is deeper than the distance of the metallic layer(s) of the coating in order to create an isolated zone. The laser by working on ON/OFF function in order to create sides of second decoated elements creates a slope 20C. This slope allows the second decoated element to be more discreet for eyes. Preferably, intersection point(s) of the second decoated element are after the slope where the decoated is substantially parallel to the surface of the coating system in order to have an isolated structure as discreet as possible According to the present invention, the glazing unit may comprises several frequencies selective decoated portions on the coating with different sizes of first and second decoated elements in order to maximise the RF transparency of the glazing unit.

According to the present invention, the glazing unit may comprises several frequencies selective decoated portions with same characteristics on the coating in order to have a better spreading of the RF signal.

In some embodiments, at least one antenna can be placed in front of the frequencies selective decoated portion in order to let the at least one antenna radiates trough the glazing unit and/or received radiation from the other size of the glazing unit.

The glazing unit according to the invention is capable of increasing the transmission of waves with lower frequencies, below 6 GHz, and mmWave, above 15 GHz through the glazing unit with attenuation level for H or V polarization of at most −10 decibels (dB) while keeping the coating performances and minimizing the decoating percentage and the aesthetic between the coating and the decoating in order to keep the level of invisibility as high as possible.

The invention claimed is:

1. A glazing unit comprising:
a glass panel which is low in reflectance for RF radiation;
a coating system which is high in reflectance for RF radiation disposed on the glass panel;
at least one frequencies selective decoated portion of the coating system extending along a plane, P, defined by a longitudinal axis, X, and a vertical axis, Z; having a width, DW, measured along the longitudinal axis, X, and a length, DL, measured along the vertical axis, Z, comprising a first decoated element comprising a plurality of interconnected unit cells forming a regular grid and a plurality of second decoated elements wherein a second decoated element is placed in each unit cell of the first decoated element and wherein no second decoated element is in contact with the first decoated element,
wherein the second decoated elements comprise:
a first segment AB wherein a point B is a free termination,
a second segment CD wherein a point D is a free termination, and
an intersection point E between the first segment AB and the second segment CD forming sub-segments AE, EB, CE and ED wherein:
a length, $\overline{ED}$, of the sub-segment EB is less than a length, $\overline{AE}$, of the sub-segment AE and higher than 0 ($0<\overline{EB}<\overline{AE}$), and
a length, $\overline{ED}$, of the sub-segment ED is less than a length, $\overline{CE}$, of the sub-segment CE and higher than 0 ($0<\overline{ED}<\overline{CE}$).

2. The glazing unit according to claim 1, wherein the second decoated elements further comprise:
more than or equal to one additional segment; and
interactions points between segments, wherein each segment has one interaction point with another segment and wherein each segment has at most two intersection points.

3. The glazing unit according to claim 2, wherein the second decoated elements comprise two additional segments:
a third segment FG wherein a point F is a free termination and an intersection point H between the third segment FG and the second segment CD forming sub-segments FH, HG, CH, HE and ED wherein a length, $\overline{HG}$, of the sub-segment HG is less than a length, $\overline{FH}$, of the sub-segment FH and higher than 0 ($0<\overline{HG}<\overline{FH}$); and
a fourth segment IJ wherein a point I is a free termination and an intersection point K between the fourth segment IJ and the third segment FG forming sub-segments IK, KJ, FK, KH and HG wherein a length, $\overline{KJ}$, of the sub-segment KJ is less than a length, $\overline{IK}$, of the sub-segment IK and higher than 0 ($0<\overline{KJ}<\overline{IK}$) forming central sub-segments and lateral sub-segments.

4. The glazing unit according to claim 3, wherein a sum of lengths of longest lateral sub-segments of segments having only lateral sub-segments added to a length of central sub-segments of segments having a central sub-segment equals to $n\lambda/2$ wherein n is a positive integer greater than 0.

5. The glazing unit according to claim 2, wherein the second decoated element comprises a fourth segment IJ wherein a point I is a free termination, an intersection point K between the fourth segment IJ and the third segment FG forming sub-segments IK, KJ, FK, KH and HG wherein a length, KJ , of the sub-segment KJ is less than a length, $\overline{IK}$, of the sub-segment IK and higher than 0 ($0<\overline{KJ}<\overline{IK}$) and an intersection point L between the fourth segment IJ and the first segment AB forming sub-segments AL, LE, EB, IL, LK and KJ wherein a length, $\overline{KJ}$, of the sub-segment KJ is less than a length, $\overline{KL}$, of the sub-segment $\underline{KL}$ and higher than 0 ($0<\overline{KJ}<\overline{LK}$).

6. The glazing unit according to claim 5, wherein a sum of the lengths of sub-segments between intersection points is equal to $n\lambda$, wherein n is a positive integer greater than 0 (LE+EH+HK+KL=$n\lambda$ wherein n is a positive integer greater than 0).

7. The glazing unit according to claim 4, wherein at least one angle formed by an intersection of two segments is 90°.

8. The glazing unit according to claim 1, wherein each unit cell of first decoated element is a regular square with sides in X and Z axis to form a regular squared grid decoated element.

9. The glazing unit according to claim 8, wherein at least one segment of the second decoated elements is substantially parallel to one side of the unit cells of the first decoated element.

10. The glazing unit according to claim 1, wherein the glass panel comprises at least one glass sheet.

11. The glazing unit according to claim 10, wherein the glass panel comprises two glass sheets separated by a spacer.

12. The glazing unit according to claim 10, wherein the glass panel comprises two glass sheets laminated together by at least one interlayer.

13. The glazing unit according to claim 2, wherein each segment has two interaction points with two different other segments to form a closed shape.

14. The glazing unit according to claim 7, wherein the glass panel comprises at least one glass sheet.

15. The glazing unit according to claim 14, wherein the glass panel comprises two glass sheets separated by a spacer.

16. The glazing unit according to claim 14, wherein the glass panel comprises two glass sheets laminated together by at least one interlayer.

17. The glazing unit according to claim 5, wherein at least one angle formed by an intersection of two segments is 90°.

18. The glazing unit according to claim 17, wherein the sum of the lengths of sub-segments between intersection points is equal to $n\lambda\square$, wherein n is a positive integer greater than 0 (LE+EH+HK+KL=$n\lambda\square$ wherein n is a positive integer greater than 0).

19. The glazing unit according to claim 1, wherein a side of a unit cell is used to create an adjacent unit cell.

20. A method for manufacturing a glazing unit according to claim 1 comprising:
A. removing a part of the at least one frequencies selective decoated portion by laser ablation to form a first dimension of the first decoated element;
B. removing a part of the at least one frequencies selective decoated portion by laser ablation to form a second dimension of the first decoated element;
C. if the first decoated element has more than two dimensions, repeating step B as many times as the first decoated element has dimensions;
D. removing a part of the at least one frequencies selective decoated portion by laser ablation of the first segment of the plurality of second decoated elements,
E. removing a part of the at least one frequencies selective decoated portion by laser ablation a second segment of the plurality of second decoated elements; and
F. if the second decoated element has more than two segments, repeating step E as many times as the second decoated element has segments in addition to the first two segments.

21. A method for manufacturing a glazing unit according to claim 1, wherein at least one frequencies selective decoated portion comprises:

the unit cells of first decoated element are regular squares with sides in X and Z axis to form a regular squared grid first decoated element, and the plurality of second decoated elements comprises four segments with two segments substantially parallel to the X-axis and to one side of the first decoated element and two segments substantially perpendicular to the two other segments and four intersection points, wherein each section has three sub-segments, one central sub-segment and two lateral sub-segments, and each central sub-segment of each segment has substantially a same length as the other central sub-segments, comprising:

A. removing a portion of the coating by laser ablation to form a first line in the X-axis of the first decoated element, B. repeating step A to provide all lines in the X-axis of the first decoated element, C. removing a portion of the coating by laser ablation to form a first line in the Z-axis of the first decoated element, D. repeating step C to provide all lines in the Z-axis of the first decoated element, E. removing a portion of the coating by laser ablation to form a first discontinued line in the X-axis in order to create a first segment in the X-axis of the second decoated elements, F. removing a portion of the coating by laser ablation to form a second discontinued line in the X-axis adjacent to the first discontinued line in order to create a second segment in the X-axis of the second decoated elements, G. repeating steps E and F to provide all segments in the X-axis of second decoated elements, H. removing a portion of the coating by laser ablation to form a first discontinued line in the Z-axis in order to create a first segment in the Z-axis of the second decoated elements, I. removing a portion of the coating by laser ablation to form a second discontinued line in the Z-axis adjacent to the first discontinued line in order to create a second segment in the Z-axis of the second decoated elements, and J. repeating steps H and I to provide all segments in the Z-axis of second decoated elements.

* * * * *